(12) United States Patent
Nam et al.

(10) Patent No.: US 8,212,977 B2
(45) Date of Patent: Jul. 3, 2012

(54) IN-PLANE SWITCHING MODE LIQUID CRYSTAL DISPLAY WITH A RETARDATION LAYER FORMED DIRECTLY ON A COLOR FILTER SUBSTRATE IN A REFLECTION REGION

(75) Inventors: Mi Sook Nam, Anyang-si (KR); Hyung Ki Hong, Seoul (KR)

(73) Assignee: LG Display Co. Ltd., Seoul (KR)

( * ) Notice: Subject to any disclaimer, the term of this patent is extended or adjusted under 35 U.S.C. 154(b) by 1094 days.

(21) Appl. No.: 11/637,054

(22) Filed: Dec. 12, 2006

(65) Prior Publication Data

US 2007/0153195 A1    Jul. 5, 2007

(30) Foreign Application Priority Data

Dec. 30, 2005 (KR) .......................... 10-2005-135406
Aug. 14, 2006 (KR) .......................... 10-2006-076703

(51) Int. Cl.
  *G02F 1/1335* (2006.01)
  *G02F 1/1343* (2006.01)
(52) U.S. Cl. .................... 349/114; 349/117; 349/141
(58) Field of Classification Search .................. 349/114, 349/117, 141
  See application file for complete search history.

(56) References Cited

U.S. PATENT DOCUMENTS

| | | | |
|---|---|---|---|
| 6,724,036 B1 | 4/2004 | Hsieh et al. | |
| 6,809,789 B2 * | 10/2004 | Kim et al. | 349/139 |
| 2003/0218664 A1 * | 11/2003 | Sakamoto et al. | 347/114 |
| 2004/0105058 A1 * | 6/2004 | Lu | 349/114 |
| 2005/0105033 A1 | 5/2005 | Itou et al. | |
| 2005/0140867 A1 | 6/2005 | Choi | |
| 2005/0140902 A1 | 6/2005 | Yang et al. | |
| 2005/0206824 A1 * | 9/2005 | Son et al. | 349/141 |
| 2005/0264720 A1 | 12/2005 | Itou et al. | |
| 2005/0264731 A1 * | 12/2005 | Itou et al. | 349/114 |
| 2006/0193999 A1 * | 8/2006 | Verall et al. | 428/1.1 |
| 2006/0262256 A1 * | 11/2006 | Kim | 349/114 |

FOREIGN PATENT DOCUMENTS

| | | |
|---|---|---|
| JP | 2005-338256 | 12/2005 |
| JP | 2006-039369 | 2/2006 |
| JP | 2006-098623 | 4/2006 |
| JP | 2006-171376 | 6/2006 |
| JP | 2006-292847 | 10/2006 |
| JP | 2007-047732 | 2/2007 |
| TW | 200407623 | 5/2004 |
| TW | 200410182 | 6/2004 |
| TW | 200424680 | 11/2004 |
| TW | 200508721 | 3/2005 |
| WO | WO 2004/090024 A1 | 10/2004 |

\* cited by examiner

*Primary Examiner* — Jessica M Merlin
(74) *Attorney, Agent, or Firm* — McKenna Long & Aldridge, LLP

(57) ABSTRACT

An in-plane switching mode liquid crystal display device includes: a lower substrate and an upper substrate which face each other; a gate line and a data line on the lower substrate such that the gate line and the data line cross each other to define a pixel region that is divided into a transmissive region and a reflective region; a thin film transistor arranged at a crossing of the gate line and the data line; a reflective plate in the reflective region; a pixel electrode and a common electrode arranged in an alternating pattern at the pixel region; a retardation layer arranged on the upper substrate to correspond to the reflective region; a liquid crystal layer between the upper substrate and the lower substrate; and a first polarizing plate and a second polarizing plate at outer surfaces of the lower substrate and the upper substrate, respectively.

28 Claims, 7 Drawing Sheets

IN-PLANE SWITCHING MODE LIQUID CRYSTAL DISPLAY WITH A RETARDATION LAYER FORMED DIRECTLY ON A COLOR FILTER SUBSTRATE IN A REFLECTION REGION

This application claims the benefit of the Korean Patent Application Nos. P2005-135406 and P2006-76703, filed on Dec. 30, 2005 and Aug. 14, 2006 respectively, which are hereby incorporated by reference for all purposes as if fully set forth herein.

BACKGROUND OF THE INVENTION

1. Field of the Invention

The present invention relates to a liquid crystal display device. More particularly, the present invention relates to an in-plane switching mode liquid crystal display device which achieves efficient operations in both reflection and transmission modes while improving a contrast ratio thereof.

2. Discussion of the Related Art

A liquid crystal display device, a widely used flat panel display device, includes liquid crystal material having the fluidity of a liquid and the optical properties of a crystal. An electric field is applied to the liquid crystal to change the optical anisotropy of the liquid crystal. The power consumption of the liquid crystal display device is lower than that of a related art cathode ray tube, and the volume of the liquid crystal display device is less than that of the related art cathode ray tube. Furthermore, the liquid crystal display device can be manufactured in larger sizes and high definition. Consequently, the liquid crystal display device is widely used.

The liquid crystal display device further includes a color filter array substrate which forms an upper substrate and a thin film transistor (TFT) array substrate which forms a lower substrate. The upper and lower substrates are arranged to face each other, and a liquid crystal layer is formed between the upper and lower substrates, with the liquid crystal layer having dielectric anisotropy. The liquid crystal display device having the above described configuration is driven as TFTs added to hundreds of thousands of pixels are switched via address lines used for the selection of pixels, so as to apply a voltage to the corresponding pixels.

Based on the properties of a liquid crystal and the structure of a pattern, liquid crystal display devices may be constructed in various different modes.

Specifically, liquid crystal display devices may be classified into: a twisted nematic (TN) mode liquid crystal display device in which liquid crystal directors are arranged such that the liquid crystal directors are twisted 90°, and voltage is applied to the liquid crystal directors to control the liquid crystal directors; a multi-domain mode liquid crystal display device in which a pixel is divided into several domains, and directions of main viewing angles of the respective domains are changed to accomplish a wide viewing angle; an optically compensated birefringence (OCB) mode liquid crystal display device in which a compensating film is attached to a substrate to compensate for the change in the phase of light depending upon the path of the light, an in-plane switching mode liquid crystal display device in which two electrodes are formed on a substrate such that liquid crystal directors are twisted on the even plane of an orientation film, and the like.

Liquid crystal display devices may further be classified as a transmissive liquid crystal display device in which a backlight is used as a light source, a reflective liquid crystal display device in which external natural light is used as a light source instead of the backlight, and a reflective-transmissive liquid crystal display device for overcoming not only a problem of the transmissive liquid crystal display device in that the backlight has a requires an enormous power consumption, but also a problem of the reflective liquid crystal display device in that the use of the reflective liquid crystal display device is impossible when external natural light is dim.

The reflective-transmissive liquid crystal display device includes both a reflective region and a transmissive region in each unit pixel. Therefore, the reflective-transmissive liquid crystal display device can be used as the reflective liquid crystal display device and the transmissive liquid crystal display device as occasion demands.

In the transmissive region that is included in the transmissive liquid crystal display device and the reflective-transmissive liquid crystal display device, if light generated by the backlight is incident thereto by passing through the lower substrate, the transmissive region transmits the light to the liquid crystal layer, so as to achieve an increased brightness. The reflective region that is included in the reflective liquid crystal display device and the reflective-transmissive liquid crystal display device, if bright external natural light is incident thereto by passing through the upper substrate, the reflective region reflects the external light, so as to achieve an increased brightness.

To maximize the operational efficiency of each of the reflective region and the transmissive region, there has been proposed a dual-cell gap technology in which a cell gap in the transmissive region is approximately two times the cell gap in the reflective region.

A method for operating an in-plane switching mode liquid crystal display device in a transflective mode has been proposed. Even in this case, the operational efficiency of the liquid crystal display device in the transflective mode can be maximized by constructing electrodes on the basis of the dual-cell gap technology.

A related art in-plane switching mode liquid crystal display device, which is operated in a transflective mode, will be described with reference to the accompanying drawing.

FIG. 1 is a schematic view illustrating a related art in-plane switching mode liquid crystal display device.

As shown in FIG. 1, the related art in-plane switching mode liquid crystal display device includes a lower substrate 10 and an upper substrate 20 which are arranged to face each other, a liquid crystal layer 50 formed between the upper and lower substrates 20 and 10, a first polarizing plate 31 formed at an outer surface of the lower substrate 10, and a second polarizing plate 32 formed at an outer surface of the upper substrate 20. On the lower substrate 10 are defined a transmissive region 12 and a reflective region 11 separately.

The transmissive region 12 and the reflective region 11 constitute each pixel region where pixel electrodes (not shown) and common electrodes (not shown) are alternately formed. When a voltage is applied to the respective electrodes, the electrodes create a horizontal electric field to allow liquid crystals located between the pixel electrode and the common electrode to be oriented in a horizontal direction.

The lower substrate 10 is a thin film transistor array substrate that is formed with a plurality of lines and thin film transistors to apply a signal to the pixel electrodes and the common electrodes. The upper substrate 20 is a color filter array substrate that is formed with a color filter array.

Although not shown, on the lower substrate 10 are formed pluralities of gate lines and data lines so that the gate lines and the data lines cross with each other to define each pixel region. The thin film transistors are formed at respective crossings between the gate lines and the data lines. A gate insulation film is formed as an interlayer film between the gate lines and the data lines, and a protective film is formed as an interlayer film between the data lines and the pixel electrodes.

In the above described structure, a portion of the liquid crystal layer 50, which corresponds to the reflective region 11, has an optical path two times of that of the remaining portion of the liquid crystal layer 50 that corresponds to the transmissive region 12. Therefore, a cell gap in the reflective region 11 may be determined to be a half a cell gap in the transmissive region 12. In this case, the regulation of the cell gap is accomplished by regulating thicknesses of the gate insulation film and the protective film formed in each of the reflective region 11 and the transmissive region 12.

The gate insulation film and the protective film in the reflective region 11 are removed by a predetermined thickness. To maximize the operational efficiency of the liquid crystal display device in a transmission mode, the reflective region 11 and the transmissive region 12 are provided with a dual cell gap to match On/Off modes of the reflective region 11 and the transmissive region 12. A ratio of the cell gap (d1) in the transmissive region to the cell gap (d2) in the reflective region may be approximately 2:1.

Accordingly, light incident to the reflective region and light incident to the transmissive region simultaneously reach a screen surface where an image is displayed. In other words, if external natural light is incident to the reflective region from the upper side, the light reaches the screen surface after reciprocally passing through the liquid crystal layer 50. Also, if light from the backlight is incident to the transmissive region, the light reaches the screen surface after passing through the liquid crystal layer in the transmissive region that has a cell gap two times that of the reflective region. As such, the external natural light and the light from the backlight simultaneously reach the screen surface.

On an inner surface of the lower substrate 10 and the upper substrate 20 are formed first and second orientation films (not shown), respectively, to allow liquid crystal molecules of the liquid crystal layer 50 to be oriented in a predetermined direction. The first and second polarizing plates 31 and 32 are provided on the outer surfaces of the lower substrate 10 and the upper substrate 20, respectively. Between the upper substrate 20 and the second polarizing plate 32 may be further provided a phase difference plate (not shown) that serves to retard a phase difference.

The first polarizing plate 31 and the second polarizing plate 32 function to pass only light incident thereto in a direction parallel to a light transmission axis, so as to convert natural light into linearly polarized light. The phase difference plate functions to change the polarized state of light by retarding the phase of the linearly polarized light incident thereto by an angle of 180°. In the related art, a half wave plate (HWP), which has a phase difference corresponding to $\lambda/2$, is used as the phase difference plate.

By regulating a transmission axis of any one of the polarizing plates 31 and 32 and a transmission axis of the phase difference plate, and an angle of directors of liquid crystal molecules, the liquid crystal display device may have a normal black mode.

Specifically, an optical axis of the phase difference plate, i.e. the half wave plate, is aligned at an angle of $+\theta$ from a transmission axis of the upper polarizing plate and in turn, a transmission axis of the lower polarizing plate is aligned at an angle of $+\theta$ from the optical axis of the half wave plate. Also, the liquid crystals are initially oriented in a direction of $+45°$ from the transmission axis of the lower polarizing plate. In this case, if the liquid crystals are driven, the polarization direction of light to be emitted is rotated by an angle of $-45°$ toward the transmission axis of the lower polarizing plate, to thereby realize a white level.

Considering first the reflective region, when the liquid crystals are not driven (i.e. in an Off state), the polarization direction of external natural light incident to the upper polarizing plate is rotated by an angle of $2\theta$ by passing through the phase difference plate. Subsequently, the light is changed into circularly polarized light while passing through the liquid crystals and then, reaches a reflective plate. If the circularly polarized light is reflected by the reflective plate, the circularly polarized light is again changed into the linearly polarized light while passing through the liquid crystals. Thereafter, the polarization direction of the linearly polarized light is rotated by an angle of $2\theta$ by passing through the phase difference plate. As a result, the light to be emitted has an angle of 90° with the transmission axis of the upper polarizing plate. However, the light cannot pass through the transmission axis of the upper polarizing plate, resulting in a black level.

If a liquid crystal cell gap in the reflective region is d/2 (i.e. $\Delta$nd) and a cell gap for the liquid crystal layer is d/2, the liquid crystals serve as a quarter wave plate (QWP) having a phase difference corresponding to $\lambda/4$, thereby changing the linearly polarized light into the circularly polarized light and the circularly polarized light into the linearly polarized light.

Also, when the liquid crystals are driven (i.e. in an ON state), the polarization direction of the external natural light incident to the upper polarizing plate is rotated by an angle of $2\theta$ by passing through the phase difference plate. The light reaches the reflective plate after passing through the liquid crystals without any change. If the light is reflected by the reflective plate, the light again passes through the liquid crystals without any change. Thereafter, the polarization direction of the light is rotated by an angle of $2\theta$ by passing through the phase difference plate. As a result, the light to be emitted has the same direction as the transmission axis of the upper polarizing plate. Therefore, the light finally passes through the upper polarizing plate, resulting in a white level. In the case where the liquid crystals are driven, the liquid crystals are rotated by an angle of $-45°$ to thereby be oriented in the same direction as the transmission axis of the lower polarizing plate.

Meanwhile, considering the transmissive region, when the liquid crystals are not driven (i.e. in an Off state), the polarization direction of light incident from the backlight to the lower polarizing plate is changed by an angle of 90° by the liquid crystals that are oriented in their initial direction, and is further changed by an angle of $2\theta$ by the phase difference plate. As a result, the light to be emitted has an angle of 90° with the transmission axis of the upper polarizing plate. Accordingly, the light cannot pass through the upper polarizing plate, resulting in a black level.

In this case, if a liquid crystal cell gap in the transmissive region is d (i.e. $2\Delta$nd) and a cell gap for the liquid crystal layer is d, the liquid crystals serve as a half wave plate (HWP) having a phase difference corresponding to $\lambda/2$, thereby changing the polarization direction of the light. That is, the polarization direction of the light is symmetrically changed on the basis of the orientation direction of the liquid crystals.

Also, when the liquid crystals are driven (i.e. in an ON state), the light incident from the backlight to the lower polarizing plate passes through the liquid crystals without any change and then, the polarization direction of the light is changed by the phase difference plate. As a result, the light to be emitted has the same direction as the transmission axis of the upper polarizing plate, resulting in a white level. In the case where the liquid crystal cells are driven, the liquid crystals are rotated by an angle of −45°, to thereby be oriented in the same direction as the transmission axis of the lower polarizing plate.

However, differently from that of a transmissive in-plane switching mode liquid crystal display device, the polarization state of light is changed via dual refraction obtained by liquid crystals (serving as a HWP) and the phase difference plate, such as a HWP, in the transmissive region of the reflective-transmissive in-plane switching mode liquid crystal display device. Therefore, there is the risk that light having an unintentional polarization direction, such as an elliptically polarized light, etc., may be generated, resulting in a little brightness at a black level. This problem deteriorates the superiority of the black level as one of essential characteristics of IPS.

SUMMARY OF THE INVENTION

Accordingly, the present invention is directed to an in-plane switching mode liquid crystal display device that substantially obviates one or more problems due to limitations and disadvantages of the related art.

An advantage of the present invention is to provide a liquid crystal display device which achieves efficient operations in both reflection and transmission modes while improving a contrast ratio therebetween.

Additional features and advantages of the invention will be set forth in part in the description which follows, and in part will be apparent from the description, or may be learned by practice of the invention. These and other advantages of the invention may be realized and attained by the structure particularly pointed out in the written description and claims hereof as well as the appended drawings.

To achieve these and other advantages and in accordance with the purpose of the present invention, as embodied and broadly described, An in-plane switching mode liquid crystal display device includes: a lower substrate and an upper substrate which face each other; a gate line and a data line on the lower substrate such that the gate line and the data line cross each other to define a pixel region that is divided into a transmissive region and a reflective region; a thin film transistor arranged at a crossing of the gate line and the data line; a reflective plate in the reflective region; a pixel electrode and a common electrode arranged in an alternating pattern at the pixel region; a retardation layer arranged on the upper substrate to correspond to the reflective region; a liquid crystal layer between the upper substrate and the lower substrate; and a first polarizing plate and a second polarizing plate at outer surfaces of the lower substrate and the upper substrate, respectively.

In another aspect of the present invention, a liquid crystal display device includes: a lower substrate and an upper substrate which face each other; a gate line and a data line on the lower substrate such that the gate line and the data line cross each other to define a pixel region that is divided into a transmissive region and a reflective region; a thin film transistor arranged at a crossing of the gate line and the data line; a reflective plate in the reflective region; a pixel electrode and a common electrode arranged in an alternating pattern at the pixel region; a retardation layer arranged to correspond to the reflective region; a liquid crystal layer between the upper substrate and the lower substrate; and a first polarizing plate and a second polarizing plate at the lower substrate and the upper substrate, respectively.

In another aspect of the present invention, a method of making an in-plane switching mode liquid crystal display device includes: providing a lower substrate and an upper substrate which face each other; forming a gate line and a data line on the lower substrate such that the gate line and the data line cross each other to define a pixel region that is divided into a transmissive region and a reflective region; forming a thin film transistor at a crossing of the gate line and the data line; forming a reflective plate in the reflective region; forming a pixel electrode and a common electrode in an alternating pattern at the pixel region; forming a retardation layer on the upper substrate corresponding to the reflective region; forming a liquid crystal layer between the upper substrate and the lower substrate; and forming a first polarizing plate and a second polarizing plate at outer surfaces of the lower substrate and the upper substrate, respectively.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiment(s) of the invention and together with the description serve to explain the principle of the invention.

In the drawings.

DETAILED DESCRIPTION OF THE INVENTION

Reference will now be made in detail to embodiments of the present invention, examples of which are illustrated in the accompanying drawings. Wherever possible, the same reference numbers will be used throughout the drawings to refer to the same or like parts.

A liquid crystal display device according to the present invention will be described in detail hereinafter with reference to the accompanying drawings.

Figure 1:
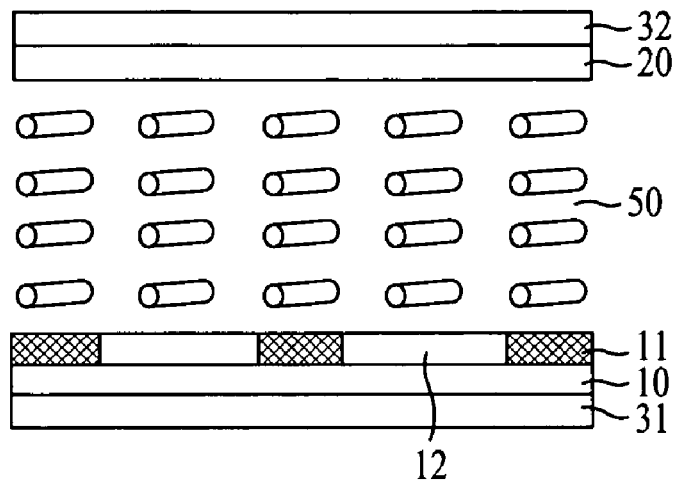
FIG. 1 is a schematic side view illustrating a related art in-plane switching mode liquid crystal display device.
Figure 2:
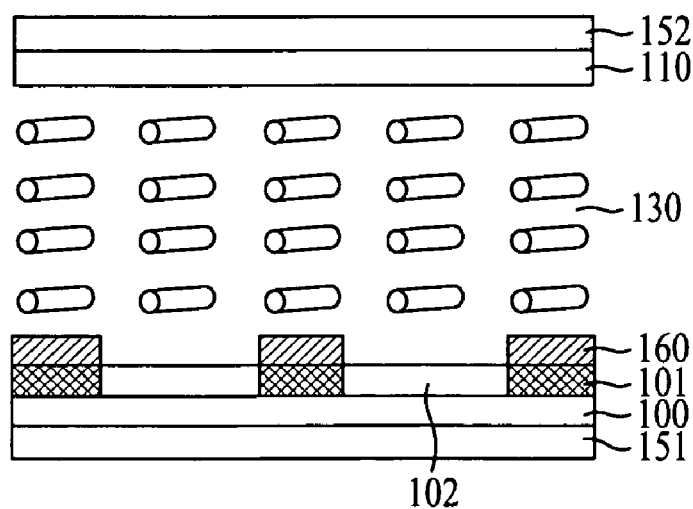
FIG. 2 is a schematic side view illustrating a liquid crystal display device according to an embodiment of the present invention, in which a retardation layer is provided on a lower substrate.

FIG. 2 is a schematic side view illustrating a liquid crystal display device according to an embodiment of the present invention, in which a retardation layer is provided on a lower substrate.

Specifically, in FIG. 2 illustrates a state in which the retardation layer is formed on the lower substrate 100 to eliminate the above described problem of the related art in that a little brightness is generated at a black level.

The configuration of the liquid crystal display device shown in FIG. 2 will now be described in detail.

As shown in FIG. 2, the liquid crystal display device according to the present invention may include a lower substrate 100 and an upper substrate 110 which are arranged to face each other, a liquid crystal layer 130 sealed between the lower substrate 100 and the upper substrate 110, a retardation layer 160 formed on the lower substrate 100 only in a reflective region, first and second orientation films (not shown) formed at inner surfaces of the lower substrate 100 and the upper substrate 110, respectively, and adapted to determine the initial orientation direction of molecules of the liquid crystal layer 130, and first and second polarizing plates 151 and 152 attached to outer circumferential surfaces of the lower substrate 100 and the upper substrate 110, respectively. The lower substrate may have pluralities of gate lines (not shown) and data lines (not shown) which cross each other to define each pixel region, thin film transistors (not shown), and a common electrode (not shown) and a pixel electrode (not shown) which serve to generate a horizontal electric field. The pixel region may be divided into a reflective region 101 and a transmissive region 102.

The above described liquid crystal display device of the present invention is operable in a transflective mode. That is, the transmissive region operates in a transmission mode by light from a backlight, whereas the reflective region operates in a reflection mode by, for example, external natural light. In this case, the external light incident to the reflective region is subjected to phase retardation by the retardation layer 160. Accordingly, the retardation layer may act to eliminate the potential of a little brightness in a black state, resulting in a normal black state.

However, in an in-plane switching mode liquid crystal display device having the above described configuration, the retardation layer 160 is formed on the lower substrate 100 in which the common electrode and the pixel electrode are formed. When forming the retardation layer 160 at the upper side of the common electrode or pixel electrode, however, there is a problem in that a drive voltage to be applied to the common electrode and the pixel electrode has to be increased to produce a normal horizontal electric field. Also, when forming the retardation layer 160 at the lower side of the common electrode or pixel electrode, the retardation layer 160 would be made of a material having heat-resistant and chemical-resistant properties for a high-temperature process that will be performed upon formation of transparent electrodes. Therefore, it is difficult to select the material for the retardation layer 160.

To solve the above described problems, in a liquid crystal display device of the present invention, it is proposed that the retardation layer 160 is formed on the upper substrate that may be formed with a color filter array.

Figure 3:
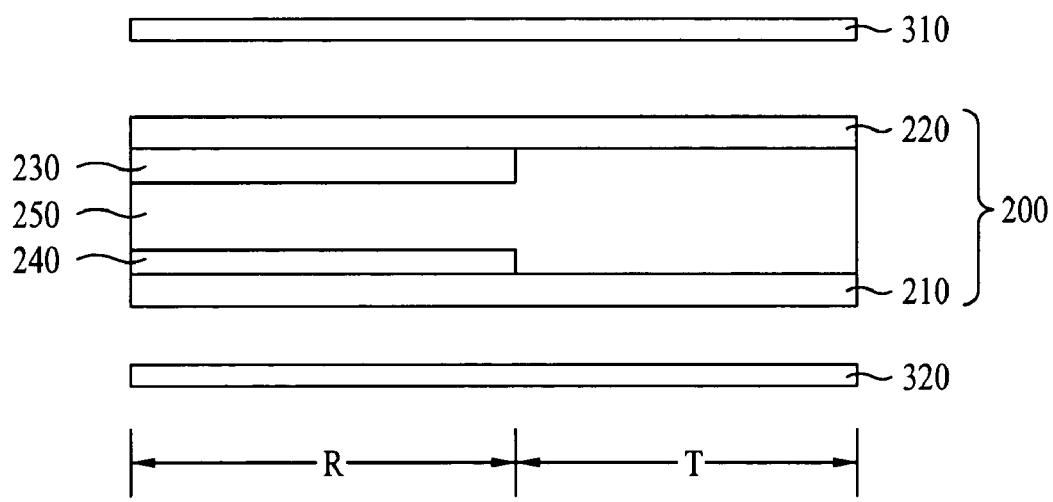
FIG. 3 is a schematic side view illustrating a liquid crystal display device according to another embodiment of the present invention.
Figure 4A:
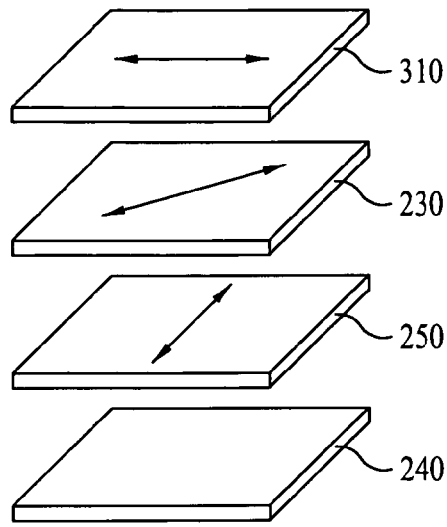
FIGS. 4A and 4B are views illustrating a transmission axis or optical axis of each layer in a reflective region and a transmissive region of FIG. 3, respectively.
Figure 4B:
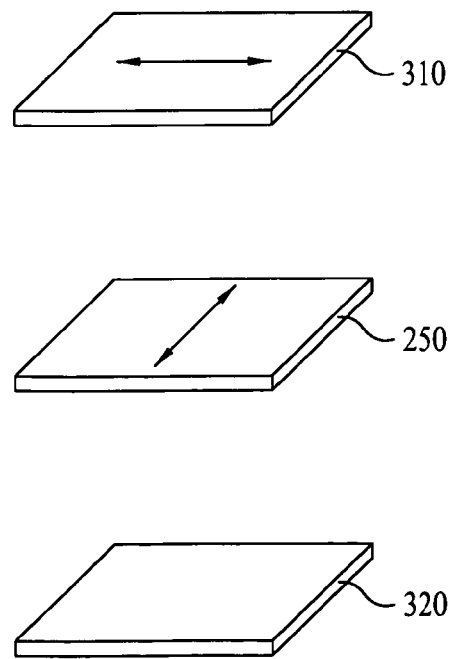
Figure 5A:
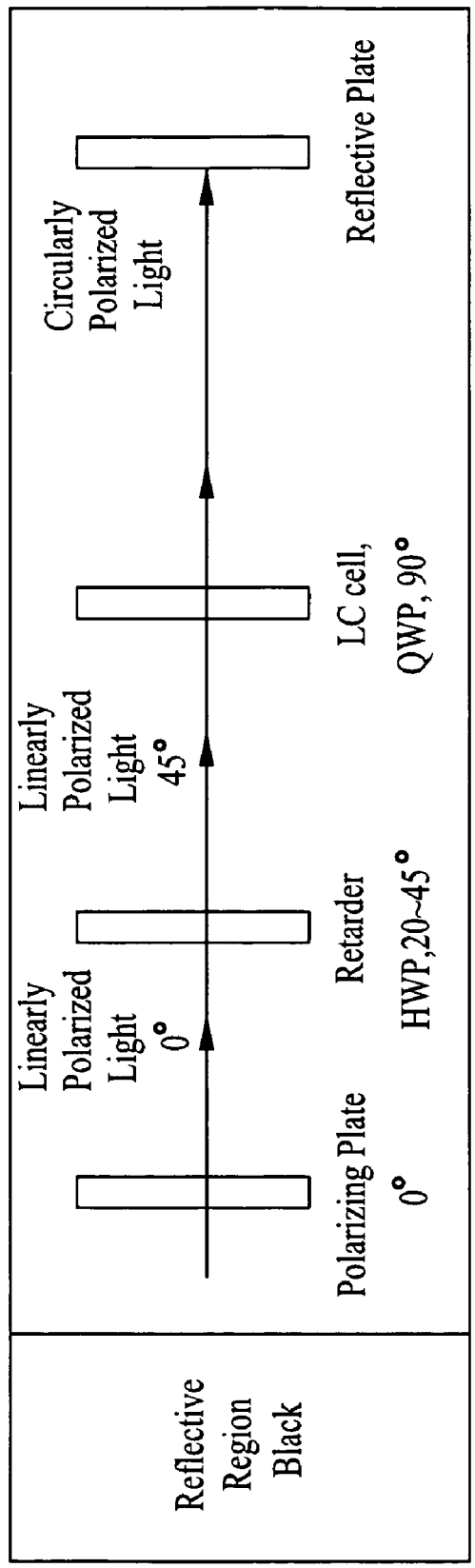
FIGS. 5A and 5B are configuration views illustrating black and white optical states of the reflective region defined in a liquid crystal display device according to the present invention.
Figure 5B:
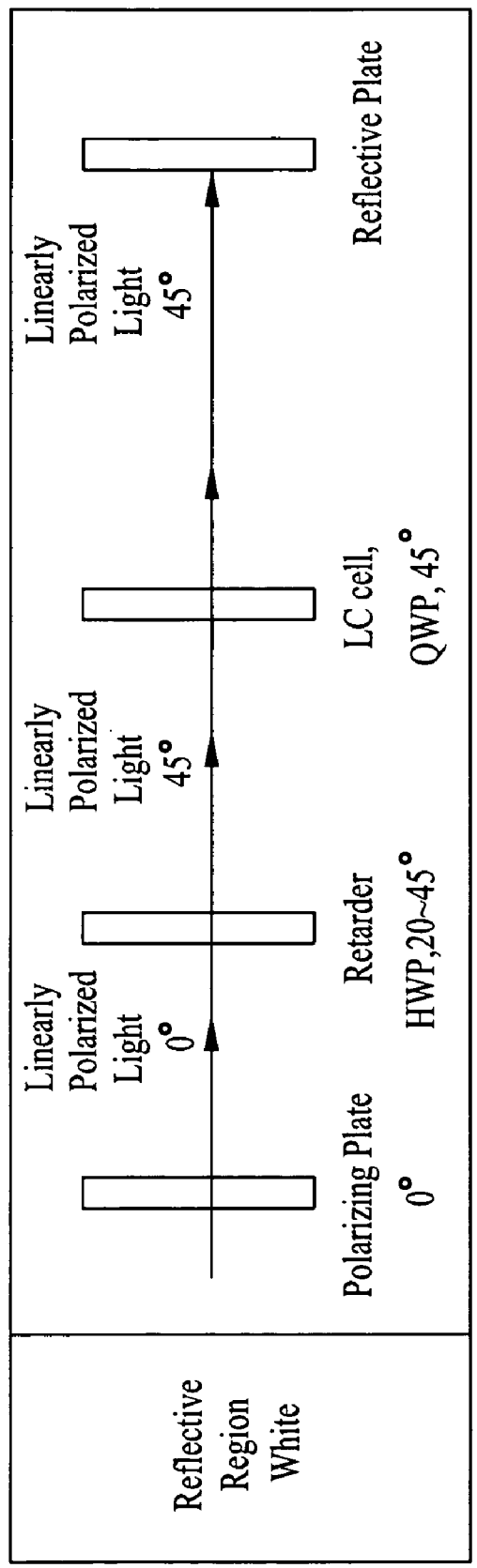

FIG. 3 is a schematic side view illustrating a liquid crystal display device according to another embodiment of the present invention. FIGS. 4A and 4B are views illustrating a transmission axis or optical axis of each layer in a reflective region and a transmissive region of FIG. 3, respectively. FIGS. 5A and 5B are configuration views illustrating black and white optical states of the reflective region defined in the liquid crystal display device according to the present invention.

As shown in FIG. 3, the liquid crystal display device of the present invention includes a lower substrate 210 and an upper substrate 220 which face each other, a reflective plate 240 formed on the lower substrate 210, a retardation layer 230 formed on the upper substrate 220 to correspond to the reflective plate 240, and a liquid crystal layer 250 formed between the lower substrate 210 and the upper substrate 220.

The lower substrate 210 may be formed with a thin film transistor array. The thin film transistor array may include a gate line (not shown, See "201" of FIG. 6) and a data line (not shown, See "202" of FIG. 6) which cross with each other to define each pixel region, a pixel electrode (not shown, See "203" of FIG. 6) and a common electrode (not shown, See "205" of FIG. 6) which may be formed in the pixel region such that the common electrode and the pixel electrode have alternately arranged portions, the pixel region being divided into a reflective region R and a transmissive region, and a thin film transistor formed at a crossing of the gate line and the data line.

Here, the reflective region R is a region where the reflective plate 240 and the retardation layer 230 are formed, and the remaining region is the transmissive region T.

Figure 7:
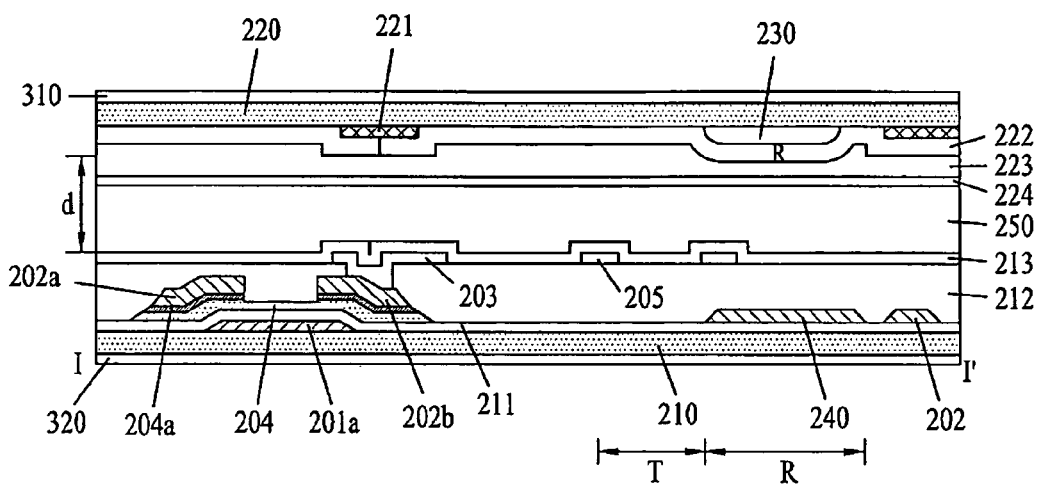
FIG. 7 is a sectional view taken along the line I-I' of FIG. 6.

The upper substrate 220 may be formed with a black matrix layer (not shown, See "221" of FIG. 7), a color filter layer (not shown, See "222" of FIG. 7), and an overcoat layer (not shown, See "223" of FIG. 7).

Here, a combination of the lower substrate 210, the upper substrate 220 and the liquid crystal layer 250 is called a liquid crystal panel 200. A first polarizing plate 310 and a second polarizing plate 320 are formed at upper and lower outer surfaces of the liquid crystal panel 200, respectively.

Although not shown, to determine the initial orientation of a liquid crystal in the liquid crystal layer 250 relative to the lower substrate 210 and the upper substrate 220, first and second orientation films (See "213" and "224" of FIG. 7) may be further formed. In this case, the first and second orientation films are configured to have an orientation direction that is substantially parallel to or orthogonal to a transmission axis of each of the first and second polarizing plates 310 and 320.

Here, the retardation layer 230 may be made of a liquid crystal material containing reactive mesogen (RM) and may be formed, for example, by a deposition method or coating method. In the retardation layer 230, molecules of the retardation layer 230 may be arranged in a predetermined direction to determine an optical axis thereof. Although not shown, a third orientation film (not shown) may be further provided at an upper surface or lower surface of the retardation layer 230 to determine the orientation of the retardation layer 230.

Specifically, after coating the third orientation film onto a certain region of the upper substrate 220 corresponding to the reflective region R, the coated third orientation film may be subjected to a rubbing process to determine an orientation direction thereof. Thereafter, a liquid crystal material containing mesogen may be coated on the third orientation film to be initially oriented. Then, the liquid crystal material may be cured to complete the formation of the retardation layer 230.

Now, an optical axis or transmission axis of each layer provided in the liquid crystal display device of the present invention will be explained with reference to FIGS. 4A and 4B.

As shown in FIG. 4A, in relation to the reflective region in which external light incident thereto is reflected to the outside, a first polarizing plate 310, retardation layer 230, liquid crystal layer 250, and reflective plate 240 in the reflective region are sequentially stacked from the top, as show an optical variation.

As shown in FIG. 4B, in relation with the transmissive region in which light emitted from an underside backlight unit (not shown) travels to the outside, the second polarizing plate 320, the liquid crystal layer 250, and the first polarizing plate 310 in the transmissive region are sequentially stacked from the bottom, as show an optical variation.

In this case, on the basis of a transmission axis of the first polarizing plate 310, an optical axis of the retardation layer 230 may be an angle of about 20° to about 45°, an optical axis of the liquid crystal layer 250 may have an angle of about 0° or about 90°, and a transmission axis of the second polarizing plate 320 may have an angle of about 90°. The optical axis of the liquid crystal layer 250 has the same direction as that of the transmission axis of the first polarizing plate 310 or the second polarizing plate 320. For example, in the case of a normal black mode wherein a black state is an initial state, the transmission axis of each of the first and second polarizing plates 310 and 320 selectively may have an angle of about 0° and about 90°. Also, the optical axis of the liquid crystal layer 250 may have an angle of about 90° in the black state and an angle of about 45° in a white state wherein the reflective region and the transmissive region have the maximum reflectance and the maximum transmittance, respectively.

As shown in FIGS. 4A and 4B, liquid crystal molecules of the liquid crystal layer 250 in both the reflective region and the transmissive region have the same orientation as each other. In this case, since the retardation layer 230 and the reflective plate 240 may be selectively formed only in the reflective region, a cell gap in the liquid crystal layer 250 may exhibit a variety of conditions according to a retardation value and optical axis direction of the retardation layer 230. Accordingly, the cell gap in the liquid crystal layer 250 may be determined to have a value causing a phase retardation of about $\lambda/2$ in the transmissive region and a phase retardation of about $\lambda/4$ in the reflective region.

As shown in FIGS. 5A and 5B, the liquid crystal display device of the present invention shown in FIG. 3 may be fabricated to have a normal black mode by regulating angles of transmission axes of the first and second polarizing plates 310 and 320, the optical axis of the retardation layer 230, and the directors of liquid crystal molecules. In this case, the cell gap in the liquid crystal layer 250 may be regulated so that the liquid crystal layer 250 in the reflective region has a phase difference value of about $\lambda/4$ and the liquid crystal layer 250 in the transmissive region has a phase difference value of about $\lambda/2$. As stated above, a half wave plate (HWP) having a phase difference corresponding to about $\lambda/2$ may be used as the retardation layer 230.

On the basis of the transmission axis of the first polarizing plate 310, the optical axis of the retardation layer 230 may have an angle of about 20° to about 45°. Also, under the state of a normal black mode, the optical axis of the liquid crystal layer 250 may have an angle of about 90° in a black state in that no voltage is applied and an angle of about 45° in a white state via rotation of a liquid crystal. As shown in FIG. 5A, in the black state corresponding to a zero voltage application condition, Voff, if linearly polarized light is incident on the first polarizing plate 310 along the transmission axis of the first polarizing plate 310, the incident light passes through the first polarizing plate 310, the upper substrate 220, and the retardation layer 230 in sequence. After passing through the retardation layer 230, the light is changed into linearly polarized light having an angle of about 45° with the transmission axis of the first polarizing plate 310. Then, the light is changed into circularly polarized light after passing through the liquid crystal layer 250, to thereby be incident to the reflective plate 240. Thereafter, the circularly polarized light reflected by the reflective plate 240 again passes through the liquid crystal layer 250 and the retardation layer 230, and is changed into linearly polarized light having an angle of about 90° with the transmission axis of the first polarizing plate 310 after passing through the retardation layer 230. Thus, the emission of the resulting light is intercepted by the first polarizing plate 310, resulting in the black state.

The retardation value of the retardation layer 230 to accomplish the black state may be determined depending on a retardation value of the liquid crystal layer 250. In this case, the retardation value of the liquid crystal layer 250 may correspond to a range of about 137 to about 320 nm, and the retardation value of the retardation layer 230 may correspond to a range of about 137 to about 300 nm.

As shown in FIG. 5B, in the white state corresponding to a voltage application condition Von, if linearly polarized light is incident along the same direction as the transmission axis of the first polarizing plate 310, the incident light passes through the first polarizing plate 310 and the upper substrate 220 in sequence, and reaches the retardation layer 230. Then, the light is changed into linearly polarized light of 45° after passing through the retardation layer 230. When the optical axis of the liquid crystal layer 250 is rotated by an angle of about 45° by an electric field, the linearly polarized light of about 45° passes through the liquid crystal layer 250 without a variation in its polarized state, to thereby be incident to the reflective plate 240. Subsequently, the light reflected by the reflective plate 240 again passes through the liquid crystal layer 250 without a variation in its polarized state. Thereafter, the polarization direction of the linearly polarized light of 45° is changed while passing through the retardation layer 230, to thereby be emitted along the transmission axis of the first polarizing plate 310, resulting in the white state.

In this case, when the light is changed into linearly polarized light after passing through the liquid crystal layer 250, the light has a maximum brightness. In this case, the direction of the linearly polarized light has no relation with the brightness.

Experimentally, under the conditions that the retardation layer 230 is prepared by use of a HWP having a phase difference corresponding to $\lambda/2$, the optical axis of the retardation layer 230 has an angle of about 24° with the transmission axis of the first polarizing plate 310, and the optical axis of the liquid crystal layer 250 has an angle of 90° with the transmission axis of the first polarizing plate 310, it could be observed that substantially no reflection of light is caused in the wavelength of visible light under the black state (having no voltage application). Also, in an in-plane switching mode liquid crystal display device of the present invention wherein the reflective plate 240 and the retardation layer 230 are provided in the liquid crystal panel 200 only in relation with the reflective region and no retardation layer is arranged in the transmissive region, it has the effect of preventing the influence of dual refraction that may be caused in the transmissive region when a phase difference plate is located at the outside of the liquid crystal panel according to the related art.

In the in-plane switching mode liquid crystal display device of the present invention, also, liquid crystal molecules in the liquid crystal layer 250 may have the same orientation as each other in both the reflective region and the transmissive region. For this, a distance between the common electrode and the pixel electrode formed on the lower substrate may be regulated so that the molecules of the liquid crystal layer 250 in both the reflective region and the transmissive region are rotated by an angle of about 45° under the maximum reflectance and the maximum transmittance conditions when a voltage is applied as shown in FIG. 5B.

According to the present invention, in the case of the in-plane switching mode liquid crystal display device that is operable in a transflective mode, the retardation layer may be formed only in the reflective region, so as not to cause an unwanted increase in brightness at a black level when the in-plane switching mode liquid crystal display device is operated in a transmission mode.

Also, the above described arrangement of the retardation layer allows both the reflective region and the transmissive region to have the same liquid crystal cell gap as each other, resulting in a more simplified process.

Now, the internal structure of the liquid crystal panel provided in an in-plane switching mode liquid crystal display device according to the present invention will be explained with reference to the drawings.

Figure 6:
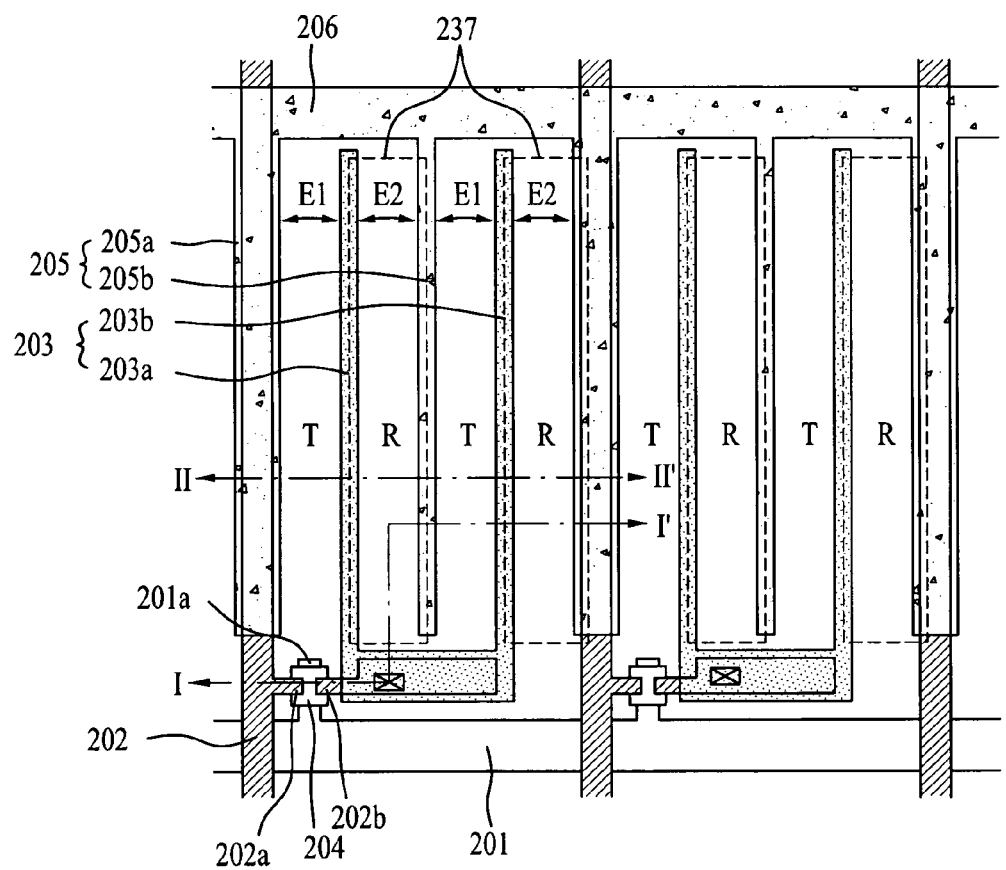
FIG. 6 is a plan view illustrating an in-plane switching mode liquid crystal display device according to the present invention.
Figure 8:
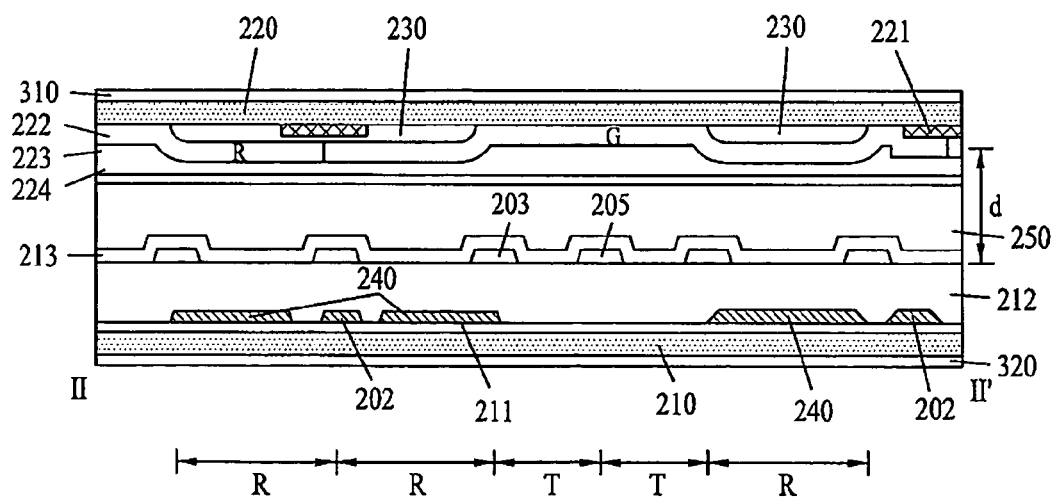
FIG. 8 is a sectional view taken along the line II-II' of FIG. 6.

FIG. 6 is a plan view illustrating the in-plane switching mode liquid crystal display device according to the present invention. FIG. 7 is a sectional view taken along the line I-I' of FIG. 6. FIG. 8 is a sectional view taken along the line II-II' of FIG. 6.

As shown in FIGS. 6 to 8, an in-plane switching mode liquid crystal display device of the present invention includes a gate line 201 and a data line 202 which are formed on the lower substrate (i.e. a thin film transistor array substrate) 210 to cross each other. The gate line 201 and the data line 202 define each pixel region and may be insulated by a gate insulation film 211. A thin film transistor (TFT) may be formed at a crossing of the gate line 201 and the data line 202 and adapted to control the Turn-On and Turn-Off of a voltage based on an addressing signal. A reflective plate 240 is formed on the lower substrate 210 in a reflective region R. If external natural light is incident on the reflective plate 240 by passing through the upper substrate 220 (i.e. a color filter array substrate), the reflective plate 240 reflects the light to the color filter array substrate. A protective film 212 may be formed throughout a surface of the lower substrate 210 including a thin film transistor and in turn, a common line 206 may be formed on the protective film 212 to extend substantially parallel to the gate line 201. The common electrode 205 may be branched from the common line 206, and the pixel electrode 203 may be formed substantially parallel to the common electrode 205. As shown, a pixel electrode 203 is connected to a drain electrode 202b of the thin film transistor by being penetrated through the protective film 212. A first orientation film 213 may be formed throughout a surface of the protective film 212 including the common electrode 205 and the pixel electrode 203 and adapted to determine the initial orientation of a liquid crystal.

As shown, the retardation layer 230 is formed on the upper substrate 220 at a position corresponding to the reflective region R.

The pixel region of the above described liquid crystal display device, as stated above, is divided into the reflective region R and the transmissive region T. The reflective region or transmissive region may be a protruding region defined by the pixel electrode and the adjacent common electrode in the pixel region. The arrangement of the reflective region and the transmissive region in the pixel region may be selectively determined. In FIG. 8, the reflective region R, transmissive region T, transmissive region T, and reflective region R are arranged in this sequence.

The number of the protruding region in the pixel region is not limited to a specific number, but may be changed by a variety of factors, such as the area of the liquid crystal display device, the number of pixels, and a pitch between the pixels. Although FIG. 6 illustrates a four block structure, for example, if a liquid crystal display device has the same size as that of FIG. 6, but the pitch of the pixels is larger than that of FIG. 6, the area of the pixel region is increased and thus, the liquid crystal device may have, for example, a six block structure. Conversely, if the pitch of the pixel is smaller than that of FIG. 6, the area of the pixel region is reduced and thus, the liquid crystal device may have, for example, a two block structure.

In the above described configuration, the reflective plate 240 is formed on the same layer as the data line 202. The common line 206 and the common electrode 205 may be formed on the protective film 212 so that they may be simultaneously formed with the pixel electrode 203 to be located on the same layer as the pixel electrode 203, or may be simultaneously formed with the gate line 201 to be located on the same layer as the gate line 201.

The thin film transistor (TFT) may include a gate electrode 201a branched from the gate line 201, the gate insulation film 211 stacked on the gate electrode 201a, a semiconductor layer 204 deposited on the gate electrode 201a by use of amorphous silicon (a-Si:H) to have an island form, an ohmic contact layer 204a formed by depositing n+a-Si that is obtained by injecting impurity ions into amorphous silicon, the ohmic contact layer 204a serving to improve a contact property of the semiconductor layer 204 relative to a certain layer located thereabove, and source/drain electrodes 202a and 202b branched from the data line 202 to be formed on the semiconductor layer 204.

Here, the gate line layer and the data line layer may be formed by depositing a low-resistance metal layer, such as a copper (Cu), aluminum (Al), aluminum alloy (AlNd), tin (Sn), molybdenum (Mo), chromium (Cr), titanium (Ti), tantalum (Ta), molybdenum-tungsten (MoW) layer, and the like, by a sputtering method, and patterning the deposited metal layer. The reflective plate 240 may also be made of a low-resistance metal layer having a high reflectance property.

The gate insulation film 211 is typically formed by depositing an inorganic insulating material, such as silicon oxide (SiOx) or silicon nitride (SiNx), throughout a surface of the lower substrate 210 by a plasma enhanced chemical vapor deposition (PECVD) method. The protective film 212 may be formed by depositing an inorganic insulating material, such as silicon oxide (SiOx), silicon nitride (SiNx), or the like, or by coating an organic insulating material, such as benzocyclobutene (BCB) or acrylic material.

Meanwhile, on the upper substrate 220 may be formed a black matrix 221, a color filter layer 222, and an overcoat layer 223. The black matrix 221 may be formed at a region of the upper substrate 220 where accurate control of a liquid crystal is difficult due to an unstable electric field, more particularly, at a region corresponding to the edge of a unit pixel and the thin film transistor, thereby serving to intercept the leakage of light. The color filter layer 222 may be formed between adjacent portions of the black matrix 221 and adapted to realize Red, Green, and Blue colors. The overcoat layer 223 may be formed throughout a surface of the upper substrate 220 including the color filter layer 222 and may be adapted to flatten the upper substrate 220. The color filter layer 222 and the overcoat layer 223 formed on the upper substrate 220 serve to compensate for a thickness difference caused by the retardation layer 230, and may have a flattened surface.

Here, the retardation layer 230 may have a thickness of approximately 1 to 2 μm.

Also, the second orientation film 224 may be formed on the overcoat layer 223.

As apparent from the above description, the in-plane switching mode liquid crystal display device according to the present invention has the following effects:

Firstly, under the assumption that the in-plane switching mode liquid crystal display device is designed to be operable in a transflective mode, according to the present invention, a retardation layer may be formed on an upper substrate of a liquid crystal panel only in a reflective region. Such a limited arrangement of the retardation layer has the effect of preventing an unwanted increase in brightness at a black level when the liquid crystal display device is operated in a transmission mode. Accordingly, the in-plane switching mode liquid crystal display device of the present invention may be operated in a transflective mode while maintaining a high contrast ratio as one of the essential characteristics of in-plane switching mode liquid crystal display devices.

Secondly, since no retardation layer is necessary in the transmissive region, the in-plane switching mode liquid crystal display device of the present invention can achieve a reduction in thickness as much as approximately 0.2 to 0.3 mm as compared to the related art wherein a phase difference plate is provided at a surface of a substrate. Also, the selective use of the retardation layer in the reflective region has the effect of reducing manufacturing costs.

Thirdly, according to the in-plane switching mode liquid crystal display device of the present invention, if the retardation layer is formed on the upper substrate, the formation of the retardation layer is unaffected by deposition and patterning of transparent electrodes including a pixel electrode, a common electrode, and the like. Accordingly, there is no limitation in the selection of a material constituting the retardation layer.

In conclusion, differently from the related art in which a phase difference plate is provided at the outside of a liquid crystal panel, the present invention has a feature in that the retardation layer may be provided into a limited internal region of the liquid crystal panel, more particularly, in the reflective region, to thereby achieve efficient operation of an in-plane switching mode liquid crystal display device in a transmission mode.

Accordingly, since the transmissive region of the liquid crystal panel may have no risk of dual refraction of light by the retardation layer, it is possible to completely eliminate brightness at a black level, resulting in an improvement in a contrast ratio of the in-plane switching mode liquid crystal display device.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. An in-plane switching mode liquid crystal display device comprising:
   a lower substrate and an upper substrate which face each other;
   a gate line and a data line on the lower substrate such that the gate line and the data line cross each other to define a pixel region that is divided into a transmissive region and a reflective region;
   a thin film transistor arranged at a crossing of the gate line and the data line;
   a reflective plate in the reflective region;
   a pixel electrode and a common electrode arranged in an alternating pattern at the pixel region;
   a retardation layer arranged on and directly contacting the upper substrate to correspond to the reflective region;
   a color filter layer and an overcoat layer entirely arranged over the retardation layer to compensate for a thickness of the retardation layer;
   a liquid crystal layer between the upper substrate and the lower substrate; and
   a first polarizing plate and a second polarizing plate at outer surfaces of the lower substrate and the upper substrate, respectively,
   wherein a cell gap of the liquid crystal layer in the transmissive region and a cell gap of the liquid crystal layer in the reflective region are the same and the overcoat layer has a relatively larger thickness in the transmissive region than in the reflective region to compensate for a thickness of the retardation layer.

2. The in-plane switching mode liquid crystal display device according to claim 1, wherein the retardation layer has a phase retardation of about $\lambda/2$.

3. The in-plane switching mode liquid crystal display device according to claim 2, wherein an optical axis of the retardation layer has an angle of about 20~45° relative to a transmission axis of the second polarizing plate.

4. The in-plane switching mode liquid crystal display device according to claim 2, wherein the liquid crystal layer has a cell gap condition for allowing the liquid crystal layer to have a phase retardation of about $\lambda/2$ in the transmissive region and a phase retardation of about $\lambda/4$ in the reflective region.

5. The in-plane switching mode liquid crystal display device according to claim 4, wherein the liquid crystal layer has an optical axis of about 45° relative to a transmission axis of the second polarizing plate in a white state.

6. The in-plane switching mode liquid crystal display device according to claim 5, wherein the liquid crystal layer has an optical axis of about 0° or about 90° relative to a transmission axis of the second polarizing plate in a black state.

7. The in-plane switching mode liquid crystal display device according to claim 5, wherein the retardation layer has an optical axis of about 24° and the liquid crystal layer has an optical axis of about 90° relative to a transmission axis of the second polarizing plate, respectively, in a black state.

8. The in-plane switching mode liquid crystal display device according to claim 1, wherein the liquid crystal layer has a retardation value corresponding to a range of about 137~320 nm.

9. The in-plane switching mode liquid crystal display device according to claim 8, wherein the retardation layer has a retardation value corresponding to a range of about 137~300 nm.

10. The in-plane switching mode liquid crystal display device according to claim 1, wherein the reflective plate is arranged on a same layer as the data line.

11. The in-plane switching mode liquid crystal display device according to claim 1, further comprising:
    a common line on a same layer as the gate line and connected to the common electrode.

12. The in-plane switching mode liquid crystal display device according to claim 1, wherein the common electrode is arranged on a same layer as the gate line.

13. The in-plane switching mode liquid crystal display device according to claim 1, wherein the common electrode is arranged on a same layer as the pixel electrode.

14. The in-plane switching mode liquid crystal display device according to claim 1, wherein the overcoat layer has a flattened surface in both the reflective region and the transmissive region.

15. The in-plane switching mode liquid crystal display device according to claim 1, wherein the retardation layer has a thickness of about 1~2 μm.

16. The in-plane switching mode liquid crystal display device according to claim 1, further comprising:
a first orientation film and a second orientation film at inner surfaces of the lower substrate and the upper substrate, respectively, to determine an orientation of the liquid crystal layer.

17. The in-plane switching mode liquid crystal display device according to claim 16, wherein the first orientation film is arranged throughout a surface of the lower substrate including the gate line, data line, thin film transistor, pixel electrode, common electrode, and reflective plate.

18. The in-plane switching mode liquid crystal display device according to claim 16, wherein the second orientation film is arranged throughout a surface of the upper substrate including the retardation layer.

19. The in-plane switching mode liquid crystal display device according to claim 1, wherein the retardation layer includes reactive mesogen (RM).

20. The in-plane switching mode liquid crystal display device according to claim 19, further comprising:
a third orientation film arranged on the retardation layer.

21. The in-plane switching mode liquid crystal display device according to claim 1, wherein the retardation layer is formed by a deposition method.

22. The in-plane switching mode liquid crystal display device according to claim 1, wherein the retardation layer is formed by a coating method.

23. The in-plane switching mode liquid crystal display device according to claim 1, wherein a block defined by the common electrode and the pixel electrode is the reflective region or transmissive region.

24. The in-plane switching mode liquid crystal display device according to claim 1, wherein liquid crystal molecules of the liquid crystal layer in both the reflective region and the transmissive region have a same orientation as each other.

25. The in-plane switching mode liquid crystal display device according to claim 24, wherein a distance between the common electrode and the pixel electrode is regulated such that the liquid crystal molecules of the liquid crystal layer in both the reflective region and the transmissive region are rotated by an angle of about 45° under the maximum reflectance and maximum transmission conditions.

26. The in-plane switching mode liquid crystal display device according to claim 1, wherein
a polarizing axis of the first polarizing plate is aligned orthogonal to a polarizing axis of the second polarizing plate, and
the liquid crystal layer is initially oriented so that an optical axis thereof coincides with a transmission axis of any one of the first and second polarizing plates.

27. A liquid crystal display device comprising:
a lower substrate and an upper substrate which face each other;
a gate line and a data line on the lower substrate such that the gate line and the data line cross each other to define a pixel region that is divided into a transmissive region and a reflective region;
a thin film transistor arranged at a crossing of the gate line and the data line;
a reflective plate in the reflective region;
a pixel electrode and a common electrode arranged in an alternating pattern at the pixel region;
a retardation layer arranged on and directly contacting the upper substrate to correspond to the reflective region;
a color filter layer and an overcoat layer entirely arranged over the retardation layer to compensate for a thickness of the retardation layer;
a liquid crystal layer between the upper substrate and the lower substrate; and
a first polarizing plate and a second polarizing plate at the lower substrate and the upper substrate, respectively,
wherein a cell gap of the liquid crystal layer in the transmissive region and a cell gap of the liquid crystal layer in the reflective region are the same and the overcoat layer has a relatively larger thickness in the transmissive region than in the reflective region to compensate for a thickness of the retardation layer.

28. A method of making an in-plane switching mode liquid crystal display device comprising:
providing a lower substrate and an upper substrate which face each other;
forming a gate line and a data line on the lower substrate such that the gate line and the data line cross each other to define a pixel region that is divided into a transmissive region and a reflective region;
forming a thin film transistor at a crossing of the gate line and the data line;
forming a reflective plate in the reflective region;
forming a pixel electrode and a common electrode in an alternating pattern at the pixel region;
forming a retardation layer on and directly contacting the upper substrate corresponding to the reflective region;
forming a color filter layer and an overcoat layer entirely arranged over the retardation layer to compensate for a thickness of the retardation layer;
forming a liquid crystal layer between the upper substrate and the lower substrate; and
forming a first polarizing plate and a second polarizing plate at outer surfaces of the lower substrate and the upper substrate, respectively,
wherein a cell gap of the liquid crystal layer in the transmissive region and a cell gap of the liquid crystal layer in the reflective region are the same and the overcoat layer has a relatively larger thickness in the transmissive region than in the reflective region to compensate for a thickness of the retardation layer.

* * * * *